United States Patent
de la Oliva et al.

(10) Patent No.: US 11,792,154 B2
(45) Date of Patent: Oct. 17, 2023

(54) MULTICAST AND UNICAST MEDIUM ACCESS CONTROL (MAC) ADDRESS ASSIGNMENT PROTOCOL (MUMAAP)

(71) Applicant: INTERDIGITAL PATENT HOLDINGS, INC., Wilmington, DE (US)

(72) Inventors: Antonio de la Oliva, Madrid (ES); Robert G. Gazda, Spring City, PA (US)

(73) Assignee: INTERDIGITAL PATENT HOLDINGS, Wilmington, DE (US)

(*) Notice: Subject to any disclaimer, the term of this patent is extended or adjusted under 35 U.S.C. 154(b) by 0 days.

(21) Appl. No.: 17/605,880

(22) PCT Filed: Apr. 23, 2020

(86) PCT No.: PCT/US2020/029550
§ 371 (c)(1),
(2) Date: Oct. 22, 2021

(87) PCT Pub. No.: WO2020/219693
PCT Pub. Date: Oct. 29, 2020

(65) Prior Publication Data
US 2022/0224671 A1 Jul. 14, 2022

Related U.S. Application Data

(60) Provisional application No. 62/838,687, filed on Apr. 25, 2019.

(51) Int. Cl.
*H04L 61/2557* (2022.01)
*H04L 61/5007* (2022.01)
(Continued)

(52) U.S. Cl.
CPC .......... *H04L 61/2557* (2013.01); *H04L 61/25* (2013.01); *H04L 61/50* (2022.05);
(Continued)

(58) Field of Classification Search
None
See application file for complete search history.

(56) References Cited

U.S. PATENT DOCUMENTS 8,428,060 B2 4/2013 Li et al.
8,804,591 B2 8/2014 Lu et al.
(Continued)

FOREIGN PATENT DOCUMENTS

WO 2014/051399 4/2014
WO 2017173134 A1 10/2017
WO 2020/150620 7/2020

OTHER PUBLICATIONS

De La Oliva et al., "IEEE 802.1CQ PALMA State Machine Proposal," (Nov. 12, 2019).
(Continued)

*Primary Examiner* — Angela Nguyen
(74) *Attorney, Agent, or Firm* — Volpe Koenig

(57) ABSTRACT

Methods and apparatuses are described herein for multicast and unicast MAC address assignment protocol (MUMAAP). A first node may transmit, to a second node, based on a unicast MAC address of the second node or a multicast MAC address associated with the second node, a discover message that may include a first MAC address or a first range of MAC addresses. The first node may receive an offer message with a second range of MAC addresses. If the first node selects a second MAC address from the received second range of MAC addresses, the first node may transmit a request message indicating that the second MAC address or the second range of MAC addresses is allocated to the
(Continued)

first node. The first node may receive an acknowledge message indicating that the second MAC address or the second range of MAC addresses is allocated to the first node.

19 Claims, 6 Drawing Sheets

(51) Int. Cl.
*H04L 61/59* (2022.01)
*H04L 61/50* (2022.01)
*H04L 61/5069* (2022.01)
*H04L 61/25* (2022.01)
*H04L 101/695* (2022.01)
*H04L 101/622* (2022.01)

(52) U.S. Cl.
CPC ...... *H04L 61/5007* (2022.05); *H04L 61/5069* (2022.05); *H04L 61/59* (2022.05); *H04L 2101/622* (2022.05); *H04L 2101/695* (2022.05)

(56) References Cited

U.S. PATENT DOCUMENTS

| | | | |
|---|---|---|---|
| 2011/0235656 A1* | 9/2011 | Pigeon | H04L 12/12 370/475 |
| 2013/0346260 A1* | 12/2013 | Jubran | G06Q 10/087 705/28 |
| 2014/0006575 A1 | 1/2014 | Subramanian | |
| 2015/0381565 A1 | 12/2015 | Thaler et al. | |
| 2018/0077111 A1* | 3/2018 | Pang | H04L 61/5061 |
| 2021/0168115 A1 | 6/2021 | De la Oliva et al. | |
| 2021/0211914 A1 | 7/2021 | De la Oliva et al. | |

OTHER PUBLICATIONS

De La Oliva et al., "IEEE 802.1CQ State Machine," (Nov. 12, 2019).

De La Oliva et al., "Proposal for IEEE 802.1 CQ-LAAP," IEEE draft, Omniran-18-0035-00-CQ00-proposal-for-IEEE-802-1cq-laap (Jan. 25, 2018).

De La Oliva, "Protocol for Assignment of Local and Multicast Addresses (PALMA)," (Jul. 17, 2019).

Draft Standard for Local and Metropolitan Area Networks: Multicast and Local Address Assignment, IEEE P802.1CQ/D0.3 (Oct. 2019).

IEEE Standard for a Transport Protocol for Time-Sensitive Applications in Bridged Local Area Networks, IEEE Std. 1722-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac—2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af—2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n—2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah—2016 (Dec. 7, 2016).

IEEE Standard for Local and Metropolitan Area Networks: Overview and Architecture; Amendment 2: Local Medium Access Control (MAC) Address Usage, IEEE Std 802c—2017(Jun. 15, 2017).

* cited by examiner

MULTICAST AND UNICAST MEDIUM ACCESS CONTROL (MAC) ADDRESS ASSIGNMENT PROTOCOL (MUMAAP)

CROSS REFERENCE TO RELATED APPLICATION

This application is the U.S. National Stage, under 35 U.S.C. § 371, of International Application No. PCT/US2020/029550 filed Apr. 23, 2020, which claims the benefit of U.S. Provisional Application No. 62/838,687 filed Apr. 25, 2019, the contents of which are incorporated herein by reference.

BACKGROUND

IEEE 802.1CQ is a standard specifying protocols, procedures, and management objects for locally unique assignment of 48-bit and 64-bit addresses in IEEE 802 networks. Specifically, IEEE 802.1CQ is working on layer 2 protocols to locally assign unicast and multicast MAC addresses to end-stations in structured local address plan (SLAP) defined in IEEE 802c over all IEEE 802 access technologies (e.g., IEEE 802.11, IEEE 802.3, etc.). However, the current layer 2 protocol, such as IEEE 1722 MAC address acquisition protocol, does not support the allocation of MAC addresses to end stations without any prior configuration or a prior allocation of the MAC addresses. Thus, protocols for the allocation of unicast and multicast MAC addresses without requiring prior configuration or allocation are needed to meet the requirements of IEEE 802.1CQ.

SUMMARY

Methods and apparatuses are described herein for multicast and unicast MAC address assignment protocol (MUMAAP). For example, a first node in a wired or wireless network may transmit, to a second node, based on a unicast MAC address of the second node or a multicast MAC address associated with the second node, a discover message that may or may not include a first MAC address or a first range of MAC addresses. If the discover message includes the first MAC address or the first range of MAC addresses, the first MAC address or the first range of MAC addresses may be determined based on a prior MAC address or range of addresses that was allocated to the first node using MUMAAP. The first node may then receive, from the second node, an offer message with a second range of MAC addresses that can be allocated to the first node. The second range of MAC addresses may include a range of unicast MAC addresses or a range of multicast addresses and may be determined by the second node based on at least one of a MAC address pool associate with the second node, the first MAC address or the first range of MAC addresses. If the first node selects a second MAC address from the received second range of MAC addresses, the first node may transmit, to the second node, a request message indicating that the second MAC address or the second range of MAC addresses is allocated to the first node. The selected second MAC address may be a unicast MAC address or a multicast MAC address and may be the same as the first MAC address or within the first range of MAC addresses. The first node may then receive, from the second node, an acknowledge message indicating that the second MAC address or the second range of MAC addresses is allocated to the first node. The first node may be a client with or without a preconfigured initial MAC address and the second node may be a sever.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
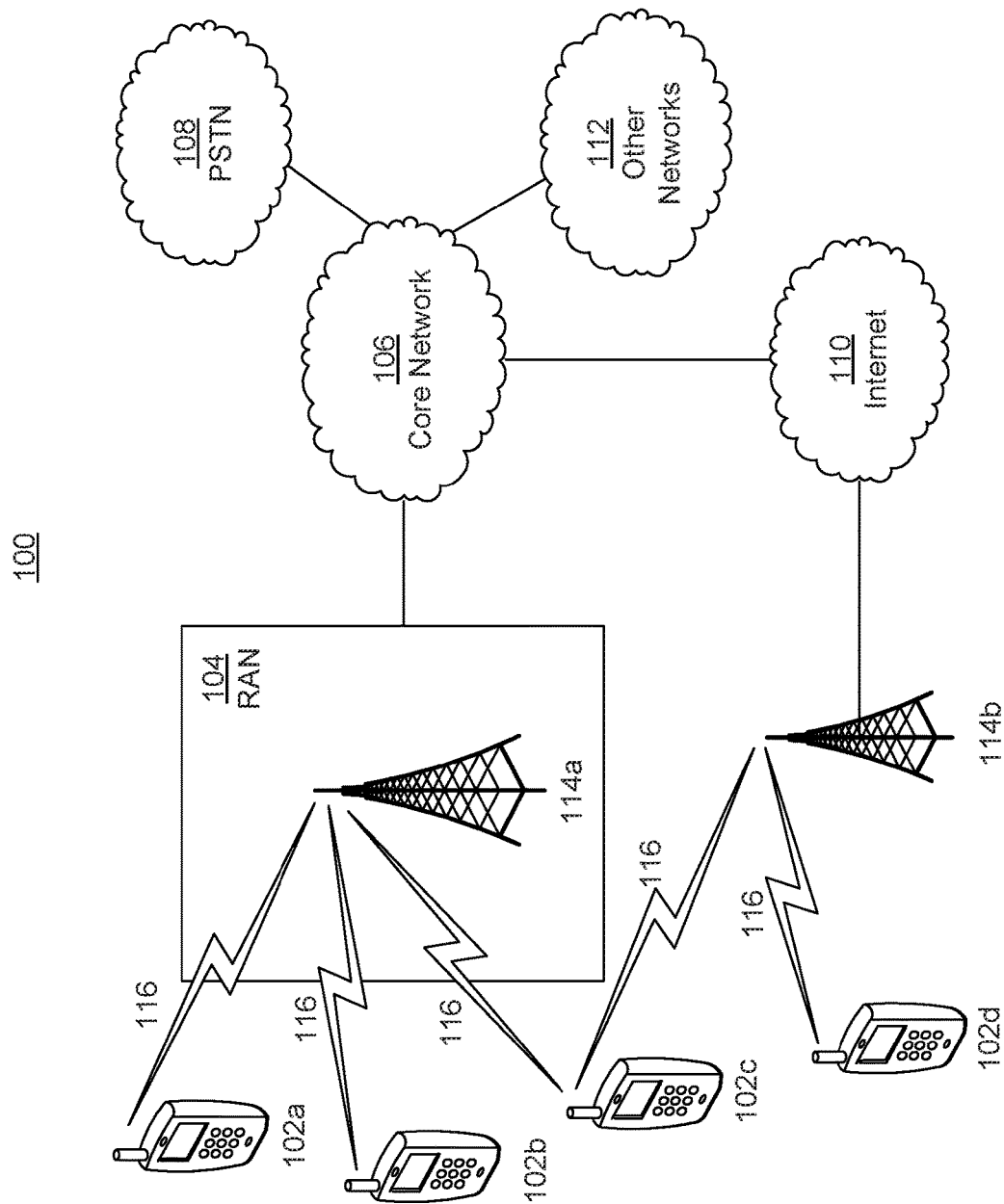
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA) or a node, may be configured to transmit and/or receive wireless signals and may include a user equipment (UE), a mobile station, a fixed or mobile subscriber unit, a network node, a node, a client, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE, a node or a client.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a network node, a node, a server, a wireless router, and the like. While the base stations 114a, 114b are each depicted as a single element, it will be appreciated that the base stations 114a, 114b may include any number of interconnected base stations and/or network elements. The base stations 114a, 114b may be interchangeably referred to as a node or a server.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
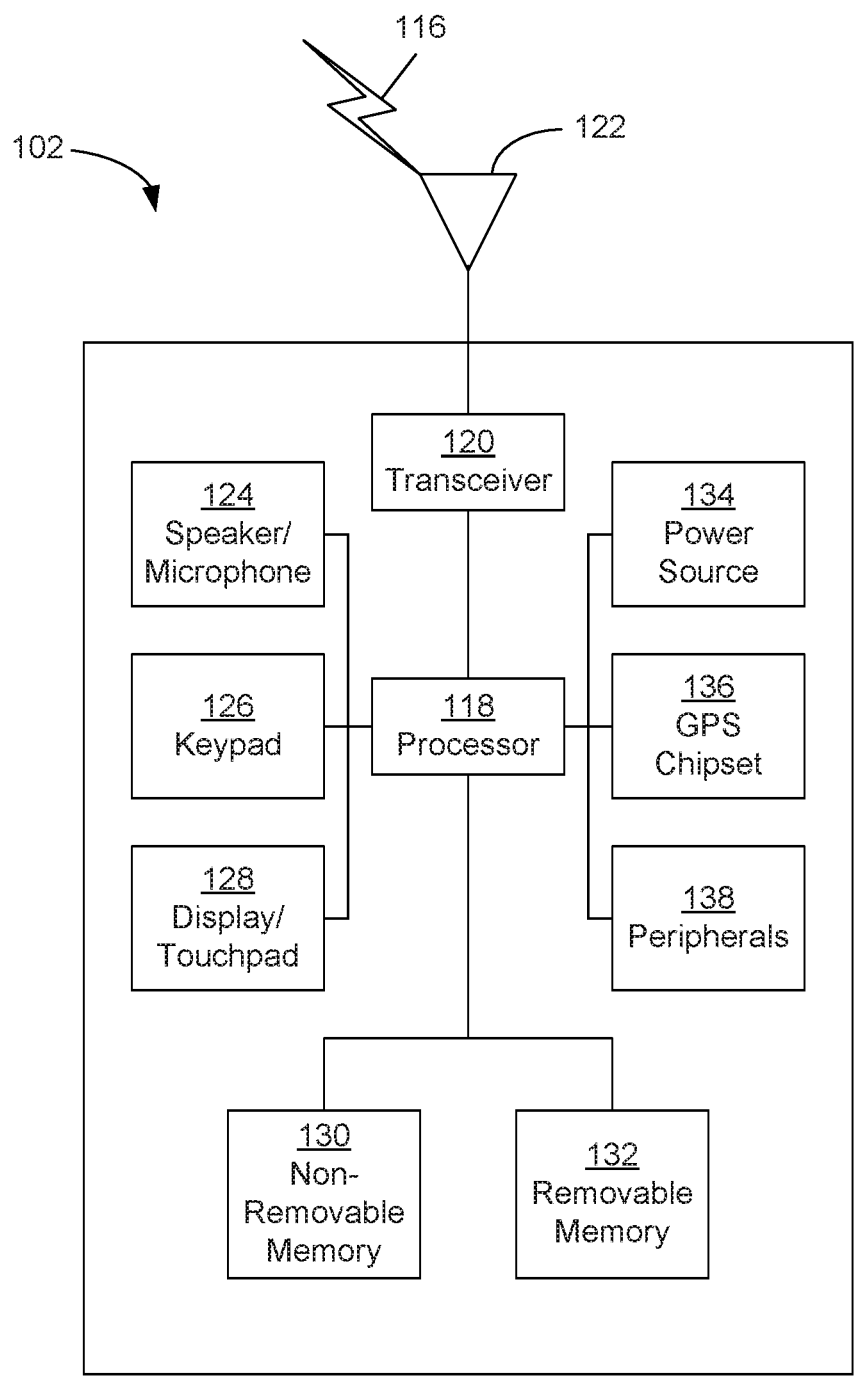
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
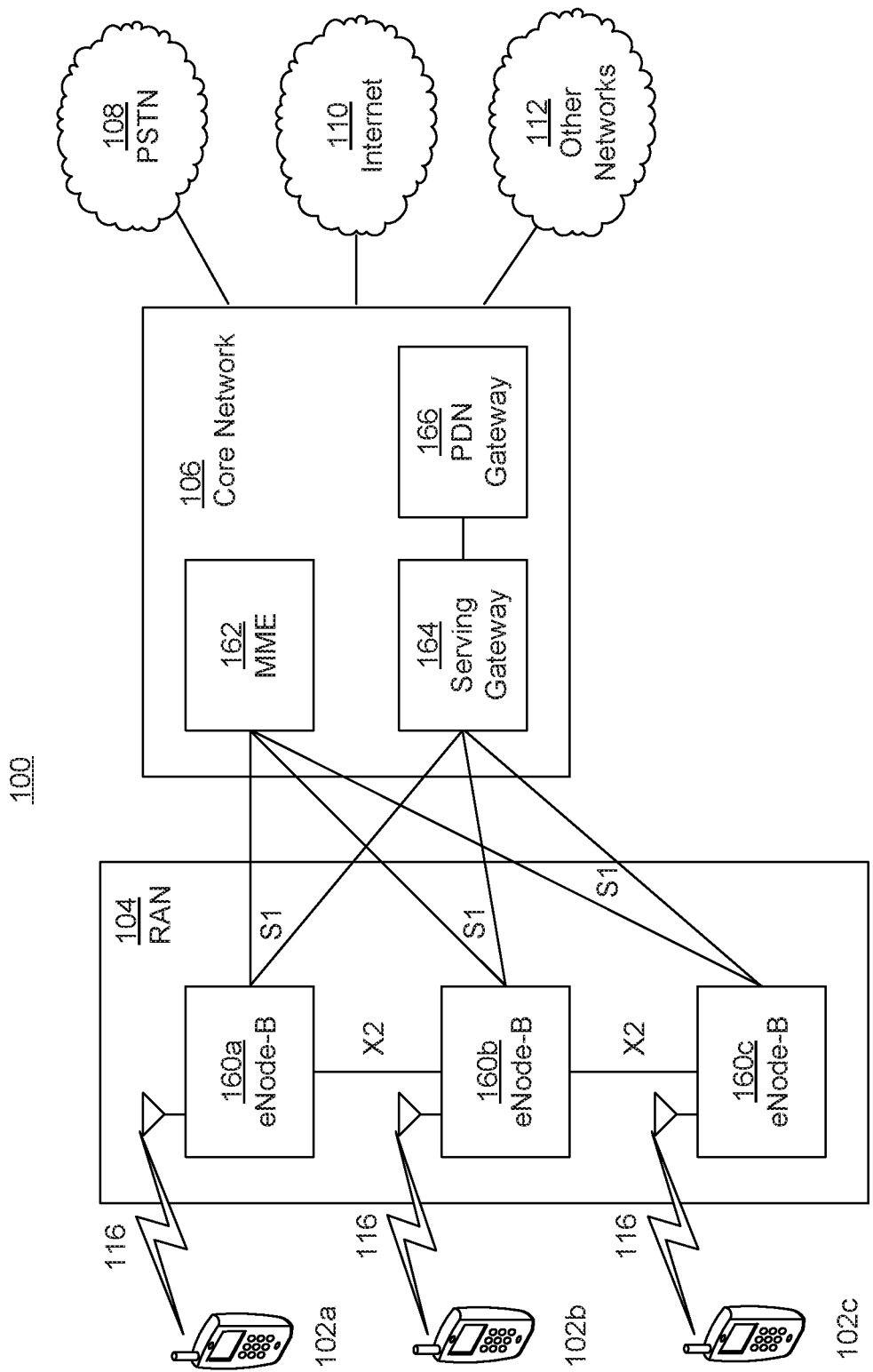
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
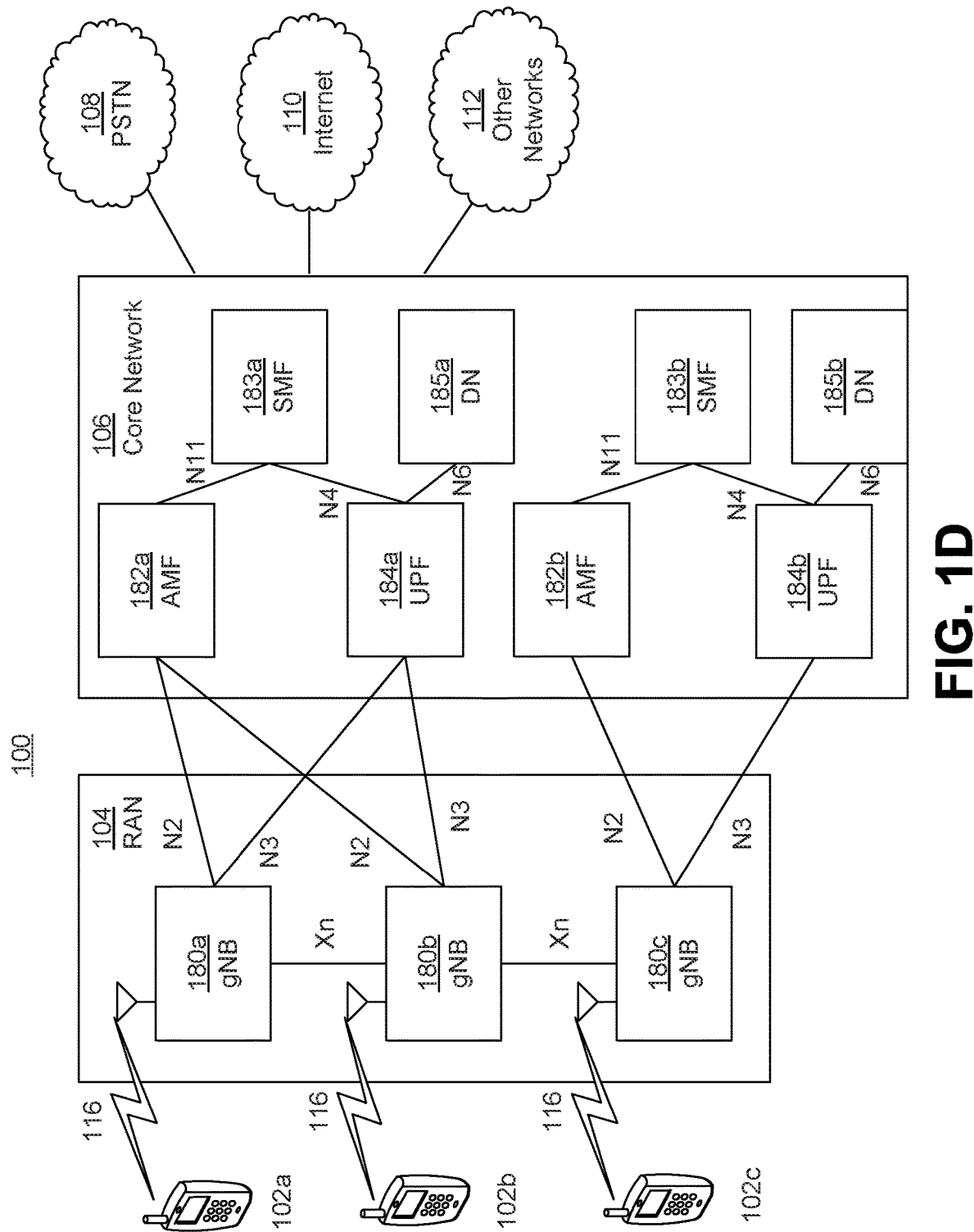
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As discussed herein, the protocol defined in IEEE 802.1CQ for the assignment of multicast and unicast MAC addresses may be specified with two types of operation: self-assignment, where a claiming-based process is used, triggered from stations; and/or server-based procedure, where a station contacts an entity which will allocate addresses in a certain pool. Both variants may be integrated in a common protocol.

The protocol may provide for a common set of messages for both the self-claiming and the server-based operation. This may be done to keep the protocol concise and reduce the overall number of messages. The self-claiming protocol is referred to as MAC Address Self-Assignment Protocol (MASAP) and the server-based version is referred to as MAC Address Server based Assignment Protocol (MASBAP).

The MASAP protocol is based on the IEEE 1722 MAC Address Acquisition Protocol (MAAP). IEEE 1722 defines the MAC Address Acquisition Protocol (MAAP), which is only used to self-claim a Multicast MAC address of a pool of addresses allocated to IEEE 1722, to be used as flow identifiers in Audio/Video transmission. MAAP is only used to self-claim (e.g., where it may not support server-based assignment). Additionally, it does not include any support from infrastructure or allocation of multicast MAC addresses. It is assumed that a unicast MAC address is allocated to the station executing MAAP. As a result, MAAP in one "as-is" scenario may not meet the needs of IEEE 802.1CQ.

MASAP may include support for authoritative responses from a Proxy serving the network (e.g., implementing the MUMAAP protocol), which may be able to capture and book-keep all the DISCOVER messages in the network and directly inform the station of the result of the self-claiming process.

The MASBAP protocol may relate in a limited way to a simplified version of DHCP in that there are four messages for initial allocation of the addresses.

As discussed herein, a station may be an end node that runs a client side of the MUMAAP protocol, while a Server may refer to the infrastructure side running the server side of the MUMAAP protocol, regardless of being a Proxy or a Server. The Server may be located in operator network infrastructure components and/or may be located in Customer Premise Equipment, such as gateways, access points, routers, home network controllers, or set-top boxes.

IEEE 1722 MAAP protocol and DHCP are incorporated herein by reference. IEEE 1722 MAAP may cover the allocation of multicast MAC addresses from a certain range. The protocol may operate from the perspective that the client has a unicast MAC address assigned or allocated to it, which may not be the case for 802.1CQ. Also, IEEE 1722 may be limited to wired environments. As such, there may be a need for messages and behaviors based on control bits that are not covered by IEEE 1722 MAAP. As discussed herein, the MAAP framework may be extended to cover operation with a Proxy, which may be able to mediate in the self-assignment process. Further, the techniques/embodiments/protocols discussed herein may replace operation of MAAP in IEEE 1722 networks, since it may be used for the same functionality if desired, and may include options such as the Station ID and the Network ID that may address issues in MAAP deployments (e.g., the occurrence of address collisions when a client belongs to multiple networks running MAAP). MUMAAP may consider the four messages exchange (i.e., discover, offer, request, acknowledge) similar to DHCP. All messages and behaviors are specific to the MUMAAP protocol.

There is a need to define a protocol for the assignment of local unicast and multicast MAC addresses to end stations, as defined in IEEE 802.1CQ and IEEE 802c. This protocol may need to support the allocation, for example, through self-assignment (i.e., self-claiming) mechanisms and/or through approaches considering a server. The protocol may also need to support the assignment of local unicast and multicast MAC addresses in the 4 quadrants defined in IEEE 802c.

As discussed herein, there is a need for a design of a local and multicast MAC address assignment protocol with two operational variants: i) self-assignment and ii) server based assignment. This protocol may need to be able to operate in multiple IEEE 802 technologies with support of the infrastructure or in stand-alone mode. Further, there may be a need for definitions of the protocol messages and the state machines for both operational modes. Also, there may be a need for support of the allocation of addresses to stations without any prior configuration/allocation/assignment, or for support of the allocation of addresses considering the station and a prior allocation.

As noted, there may be two differentiated protocol variants: i) MAC Address Self-Assignment Protocol (MASAP) and ii) MAC Address Server based Assignment Protocol (MASBAP). MASAP corresponds to the self-assignment operational mode, while MASBAP is used for server based assignment. Both protocols may share the same message structure and options, although the behavior is defined in a different way for each.

MASAP may use a DISCOVER, DEFEND and ANNOUNCE mechanism, which relies on multicast support in the network. Clients may select a unicast MAC address, or a range of MAC addresses, by randomly selecting a local unicast MAC address out of a pre-established range defined in IEEE 802.1CQ. Once the client has selected a local unicast MAC address, it may probe (via a DISCOVER message) for the availability of that MAC address or a range of MAC addresses (e.g., unicast or multicast), by sending a DISCOVER message, for example, to a pre-established multicast address, where all MASAP clients or proxies listen. After sending several DISCOVER messages without receiving any answer, the client may understand the address may be allocated to it. Afterwards, the station may start DEFEND and ANNOUNCE phases where it listens to the DISCOVER requesting its allocated (i.e., self-assigned) range of addresses and announce its allocations periodically within the network.

This basic operation, which may be similar to IEEE 1722 in some respects, but where another set of parameters and messages is used, may be extended to account for the fact that some IEEE 802 technologies (e.g., IEEE 802.11) may not support the reception of DISCOVER messages to stations that are not yet associated (i.e., stations doing the probing phase that do not yet have an assigned MAC address). Therefore, there is a need for this client operation by enabling a Proxy in the network (e.g., the IEEE 802.11 AP) to keep track of the different allocations requested by the clients through MASAP and answer directly to stations issuing DISCOVER. This may not only allow the operation of the protocol in technologies such as IEEE 802.11, but may also improve the speed of the allocation of MAC addresses since clients may receive a confirmation immediately. MASAP may use a different range of MAC addresses for assignment than MASBAP.

In case that a MASBAP server is in the network, the server may answer MASAP DISCOVER messages and assign a server-based MAC address. In this case, the MASAP client in the network may stop the process related to DEFEND and ANNOUNCE messages.

As noted, MASBAP may use a four-message exchange, similar to DHCP (i.e., discover, offer, request, acknowledge) to allocate addresses to stations. As in MASBAP, the client may auto-generate one address to be used as a source address of its messages and start a DISCOVER, OFFER, REQUEST and ACK message exchange with the server. In response to the offer, the server or proxy may offer a MAC address or a range of MAC addresses to the client. The client may receive several offers from separate servers. The server operation may be stateless, so MAC addresses may be allocated only after reception of the REQUEST message by the server. The server may issue an ACK to the client after the client may use the allocated MAC address or range of MAC addresses in the network.

MASAP may be used to self-claim unicast and multicast MAC addresses following IEEE 802c SLAP definition. The claiming of multicast MAC addresses in the ranges defined by IEEE 1722 Tables B.9 and B.10, may be out of the scope of this disclosure and may use the rules defined in IEEE 1722 MAAP.

MASAP may make use of the following rules for message addressing: source MAC address for DISCOVER messages may be chosen randomly from the range shown in Table 1; source MAC address for DEFEND and ANNOUNCE messages may use the MAC address previously assigned or the EUI-64/48 assigned to the station; destination MAC address for DISCOVER messages correspond to the multicast MAC address specified in Table 1; and/or, destination MAC address for DEFEND and ANNOUNCE messages correspond to the source MAC address of the DISCOVER message. The source addresses and/or destination addresses may be encapsulated in MSASP packets.

TABLE 1

Address Allocation

| Address Range | Function |
|---|---|
| AE:00:00:80:00:00-AE:00:00:8F:FF:FF (as an example) | Range of addresses to randomly select a source address for DISCOVER messages |
| 01:80:C2:10:00:0E (as an example) | Multicast address used as destination in DISCOVER messages |

The MASAP protocol may be similar to the IEEE 1722 MAC Address Acquisition Protocol (MAAP), but the state machines may be different. MASAP operation as defined in this document may use a similar state machine, events, constants and timers as specified in IEEE 1722. However, in MASAP, MAAP may be extended to support authoritative answers (e.g., to DISCOVER requests) from a Proxy serving the network, which is able to capture and book-keep all the DISCOVER messages in the network and directly inform the station of the result of the self-claiming process.

Table 2 shows the state machine of the MAAP protocol with additional state transitions (gray cells). Note that the table denotes only the state machine transitions for the stations.

TABLE 2

MASAP State Machine

| | | STATE | | |
|---|---|---|---|---|
| | | INITIAL | DISCOVER | DEFEND |
| EVENT | Begin! | generate_address$^a$ ReserveAddress! | -X- | -X- |
| | Release!$^c$ | -X- | Stop probe_timer INITIAL | Stop announce_timer INITIAL |
| | Restart! | generate_address ReserveAddress! | -X- | -X- |
| | ReserveAddress! | init_maap_probe_count Start probe_timer sProbe DISCOVER | -X- | -X- |
| | rProbe!$^b$ | -X- | compare_MAC$^d$ Stop probe_timer INITIAL/Restart! | sDefend |
| | rDefend!$^b$ | -X- | Stop probe_timer INITIAL/Restart! | compare_MAC$^d$ Stop announce_timer INITIAL/Restart! |
| | rAnnounce!$^b$ | -X- | Stop probe_timer INITIAL/Restart! | compare_MAC$^d$ Stop announce_timer INITIAL/Restart! |
| | probeCount! | -X- | Stop probe_timer Start announce_timer sAnnounce DEFEND | -X- |
| | announcetimer! | -X- | -X- | Start announce_timer sAnnounce |
| | probetimer! | -X- | Start probe_timer sProbe dec_maap_probe count | -X- |
| | PortOperational! | generate_address$^a$ ReserveAddress! | Stop probe_timer INITIAL/Restart! | Stop announce_timer INITIAL/Restart! |

TABLE 2-continued

MASAP State Machine

| | STATE | | |
|---|---|---|---|
| | INITIAL | DISCOVER | DEFEND |
| rProxyAnswer (status == 1) | -X- | Stop probe_timer DEFEND | -X- |
| rProxyAnswer (status == 2) | -X- | Stop probe_timer INITIAL/Restart! | Stop probe_timer INITIAL/Restart! |
| rProxyAnswer (status == 3) | -X- | Stop probe_timer INITIAL/Restart! | Stop probe_timer INITIAL/Restart! |
| rProxyAnswer (status == 3) | INITIAL/STOP | INITIAL/STOP | INITIAL/STOP |

[a] A Begin! or PortOperational! event may be initiated with an assigned address range or MASAP can select an address range with the generate_address function. If an address range is supplied with the Begin! or PortOperational! event, generate_address may not be called and the supplied address range may be used. If the application has previously obtained an address range and has access to persistent storage, the application may record the previous address range and attempt to reuse the saved address range.

[b] Only received DISCOVER, DEFEND, and ANNOUNCE PDUs that conflict with the address range associated with this state machine may generate rProbe!, rDefend!, and rAnnounce! events. All DISCOVER, DEFEND, and ANNOUNCE PDUs that do not conflict with the address range associated with this state machine may be ignored.

[c] After a Release! event is received and the state machine has returned to INITIAL state, the address range associated with this state machine may be considered to be free, and the state machine may be destroyed.

[d] If the compare_MAC function returns TRUE then no further processing or protocol action may be taken and the protocol state may not change.

In an embodiment, as shown in Table 2, upon receiving the Begin! event, the state machine running on a node may perform a generate_address function in the INITIAL state and invoke the ReserveAddress! event. Upon receiving the ReserveAddress! event, the state machine may perform a init_maap_probe_count function and start probe_timer. The node may send a DISCOVER message (i.e. sProbe) to a neighbor node and enter into the DISCOVER state until a DEFEND message is received from the neighbor node or the probe_timer is expired. If the DEFEND message is received from the neighbor node, the state machine may stop the probe_timer and invoke a Restart! event to go back to the INITIAL state. Upon receiving the Restart! event, the state machine may perform generate_address function and invoke the ReserveAddress! event as describe above. If the probe_timer is expired but the DEFEND message is not received, the state machine may invoke a probetimer! event and perform start_probe_timer function and decrease the probe_count. The node may also send a DISCOVER message (i.e. sProbe) to the neighbor node or another node in the DISCOVER state. If the probe_count goes below zero, the state machine may invoke a probeCount! event, stop the probe_timer, and start an announce_timer. Upon receiving the probeCount! event, the station may also send an ANNOUNCE message (i.e. sAnnounce) and enter into the DEFEND state.

In another embodiment, a station may receive a PROXY ANSWER or OFFER message in response to the DISCOVER message sent to another station (e.g., an AP). Upon receiving the PROXY ANSWER or OFFER message, the state machine may invoke rProxyAnswer events with various status indications. For example, if the status indication in the PROXY ANSWER or OFFER message is equal to one (1), the state machine may stop the probe_timer and the station may enter into the DEFEND state. The status indication that is equal to one (1) may indicate that the MAC address to which the station is trying to allocate is available. If the status indication in the PROXY ANSWER or OFFER message is equal to two (2) or three (3), the state machine may stop the probe_timer and invoke the Restart! event, and the station may enter into the INITIAL state. The status indication that is equal to two (2) or three (3) may indicate that the MAC address to which the station is trying to allocate is not available. This embodiment may apply to an IEEE 802.11 network.

Similar to MAAP, MASAP may operate in a peer to peer (P2P) basis, where the stations agree among themselves the status of a certain MAC address range. However, where a Proxy is available in the network, MASAP may bring the opportunity to reduce the Probing time with the Proxy answering the DISCOVER messages with an OFFER message. The use of the Proxy may also allow the protocol to work on technologies where non-associated clients may not listen to ANNOUNCE or DEFEND messages. In case a DISCOVER message is answered by an OFFER, the station may stop the DEFEND state and omit the transmission of ANNOUNCE messages, since the Proxy may take care of book-keeping the status of the addresses.

IEEE 802.11 has a set of different characteristics, such as that the stations associated to an AP cannot listen to frames sent in pre-associated state. This may be the case of the DISCOVER messages, which may be transported through ANQP to the AP. In this case, the MASAP protocol may run with a Proxy able to answer DISCOVER messages. This operational mode may also omit the use of ANNOUNCE messages, since probing nodes that are not associated, will not receive these messages, rendering them useless. It is also possible, that the current behavior achieved with the OFFER message (e.g., indication by AP of the successful allocation) may also be achieved through the use of an IEEE 802.11 Reassociation frame, containing a code such as DENIED_MAC_ADDRESS_POLICY_VIOLATION.

MASBAP may be used to assign unicast and multicast MAC addresses following IEEE 802c SLAP definition with clients discovering and requested addresses from a MASBAP server(s) or proxy in the network.

MASBAP may make use of the following rules for message addressing: source MAC address for DISCOVER messages will be chosen randomly from the range shown in Table 3; OFFER messages may carry a MAC address to be used by the MASBAP client as source MAC address; source MAC address for REQUEST messages will use the MAC Address previously assigned, the EUI-64/48 assigned to the station or the MAC address provided by the OFFER message; destination MAC address for DISCOVER messages corresponds to the multicast address specified in Table 1; and/or. destination MAC address for OFFER and ACK messages correspond to the source MAC address of the DISCOVER message or in the case of ACK the MAC address used as source of the REQUEST message.

The MASBAP protocol may be defined through the following client state machine.

The client state machine may make use of the following events (events are denoted with a ! at the end): Begin!, where the state machine is initialized or reinitialized; Release!, where a Release! event signals that the address range associated with this instance of the state machine is no longer in use; Restart! where a Restart! event signals that an error has been detected and that the state machine will be restarted; RequestAddress!, where a RequestAddress! event signals the starting of the MASBAP process; rOffer!, where a rOffer! event signals that an OFFER message has been received; rACK!, where a rACK!! event signals that an ACK message has been received; eTIMER_expire!, where a eTIMER_expire! event signals that the timer TIMER has expired; MESSAGE_count!, where a MESSAGE_count! event signals that the number of messages MESSAGE sent has reached its maximum; and/or, PortOperational!, where a PortOperational! event signals that the port has entered an operational state.

The client state machine may make use of the following actions or functions: Select_address, which decides if a previously known MAC address for this network is known and if it needs to be included in the DISCOVER; Start_TIMER_timer, which starts the timer for this specific lease; Stop_TIMER_timer, which stops the timer for this specific lease; Reset_MESSAGE_count, which sets to 0 the MESSAGE count counter; Increment_MESSAGE_count, which increments by 1 the MESSAGE count counter; sDISCOVER, which sends a DISCOVER message; sREQUEST, which sends a REQUEST message; Validate_requirements, where this action checks that a partial fulfillment of the requested parameters of the DISCOVER message is enough for the operation of the client, and it returns 1 if the state machine can continue or 0 if it does not; and/or, Select_offer, where in case multiple OFFER messages are received, this action selects one of them for continuing the process, and the mechanism to choose one might be related with the level of compliance with the requested parameters sent in the DISCOVER.

The client state machine may be based on four states as noted in Table 3.

TABLE 3

MASBAP Client States

| State | Description |
| --- | --- |
| Initial | Start of the state machine |
| Discover | Discover sent, waiting for response |
| Request | Offer received, Request sent, waiting for response |
| Bound | Address selected, ACK received |

Table 4 shows the state machine of the MASBAP client.

TABLE 4

MASBAP Client State Machine

| | | STATE | | | |
| --- | --- | --- | --- | --- | --- |
| | | INITIAL | DISCOVER | REQUEST | BOUND |
| EVENT | Begin! | Select_address RequestAddress! | -X- | -X- | -X- |
| | Release! | -X- | Stop_OfferRcv_timer INITIAL | Stop_ACKRcv_timer INITIAL | Stop_LifeTime_timer INITIAL |
| | Restart! | Select_address RequestAddress! | Stop_OfferRcv_timer INITIAL | Stop_ACKRcv_timer INITIAL | Stop_LifeTime_timer INITIAL |
| | RequestAddress! | Reset_DISCOVER_count Start_OfferRcv_timer sDISCOVER DISCOVER | -X- | -X- | -X- |
| | rOffer! | -X- | Select_Offer Validate_requirements[a] Stop_OfferRcv_timer sREQUEST Reset_REQUEST_count Start_ACKRcv_timer REQUEST | -X- | -X- |
| | rACK! (status = 3) | -X- | Stop_ACKRcv_timer INITIAL | Stop_ACKRcv_timer INITIAL | -X- |
| | rACK! (status = 4) | -X- | -X- | Stop_ACKRcv_timer Start_Lifetime_timer BOUND | -X- |
| | rACK! (status = 5-7) | -X- | Stop_ACKRcv_timer INITIAL | Stop_ACKRcv_timer REQUEST/rOffer! | -X- |
| | rACK! (status = 9) | -X- | Stop_ACKRcv_timer INITIAL | Stop_ACKRcv_timer INITIAL | -X- |
| | rACK! (status = 11) | -X- | Stop_ACKRcv_timer INITIAL | Stop_ACKRcv_timer REQUEST/rOffer! | -X- |
| | eOfferRcv_expire! | -X- | Increment_DISCOVER_count sDISCOVER start_OfferRcv_timer | -X- | -X- |

TABLE 4-continued

MASBAP Client State Machine

| | STATE | | | |
|---|---|---|---|---|
| | INITIAL | DISCOVER | REQUEST | BOUND |
| eACKRcv_expire! | -X- | -X- | Increment_REQUEST_count sREQUEST start_ACKRcv_timer | -X- |
| eLifeTime_expire![b] | -X- | -X- | -X- | INIT/Restart! |
| DISCOVER_count! | -X- | Stop_OfferRcv_timer INIT/Restart! | -X- | -X- |
| REQUEST_count! | -X- | -X- | Stop_ACKRcv_timer INIT/Restart! | -X- |
| PortOperational! | Select_address INITIAL/Request_Address! | INITIAL/Restart! | INITIAL/Restart! | |

[a] In case Validate_requirements return 0, the OFFER_timer is not stopped and the client will keep waiting for other OFFER messages arriving.
[b] This event marks the expiration of the Lifetime timer, a client before the lifetime expires, might send a REQUEST message to the server containing the Station ID and MAC address range that wants to rebind.

[a] In case Validate_requirements return 0, the OFFER_timer is not stopped and the client will keep waiting for other OFFER messages arriving.
[b] This event marks the expiration of the Lifetime timer, a client before the lifetime expires, might send a REQUEST message to the server containing the Station ID and MAC address range that wants to rebind.

Regarding the MASBAP server, its operation may be completely stateless. All information provided to the client must be treated as informational (i.e., nothing allocated) until the ACK is sent. Only after transmission of the ACK, the server may block the MAC address or range of MAC addresses allocated to the specific station.

In an embodiment, as shown in Table 4, upon receiving the Begin! event, the state machine running on a node may perform a select_address function and invoke the RequestAddress! event in the Initial state. Upon receiving the RequestAddress! event, the state machine may reset DISCOVER_count and start OfferRcv_timer. The node may also send a DISCOVER message to the proxy (or server) and enter into the DISCOVER state until an OFFER message is received from the proxy or the OfferRcv_timer is expired. If the OfferRcv_timer is expired but the OFFER message has not been received, the state machine may invoke an eOfferRcv_expire! event. Upon receiving the eOfferRcv_expire! event, the state machine may increase DISCOVER_count and start OfferRcv_timer. The node may also send a DISCOVER message to the proxy in the DISCOVER state. If the OFFER message is received from the proxy, the state machine may invoke the rOffer! event. Upon receiving the rOffer! event, the state machine may select the offer, validate the requirements, stop the OfferRcv_timer, start ACKRcv_timer and reset REQUEST_count. The node may also send a REQUEST message to the proxy and enter into the REQUEST state until an ACK message is received from the proxy or the ACKRcv_timer is expired.

If the ACKRcv_timer is expired but the ACK message is not received, the state machine may invoke an eACKRcv_expire! event. Upon receiving the eACKRcv_expire!, the state machine may increase REQUEST_count and start ACKRcv_timer. The node may also send a REQUEST message to the proxy in the REQUEST state. If the ACK message is received from the proxy, the state machine may invoke the rACK! event with various status indications. For example, if the value of status indication equals 3 or 9, the state machine may stop ACKRcv_timer and go back to the INITIAL state. If the value of status indication equals 5, 6, 7 or 11, the state machine may stop ACKRcv_timer, invoke the rOffer! event and go back to the REQUEST state. If the value of status indication equals 4, the state machine may stop ACKRcv_timer, start Lifetime_timer and enter into the BOUND state. In the BOUND state, a MAC address has been allocated to the node and the node may stop the Lifetime_timer.

In one embodiment, there may be weakness of with the protocols as discussed herein from an address exhaustion attack, where an attacker tries to block all possible addresses available at the server. Generally, with one definition of the Count fields in the options, it may require of 2^34 interactions with the server. In a situation where a range of MAC addresses available at the server do not cover all 48 bits of the address space, it may be advisable to reduce the maximum number of addresses that can be requested in a single iteration with the server. In the situation where the client requests more addresses than the allowed, an ACK message with status 11 (Parameter Problem) must be answered to the DISCOVER or REQUEST message.

Figure 2:
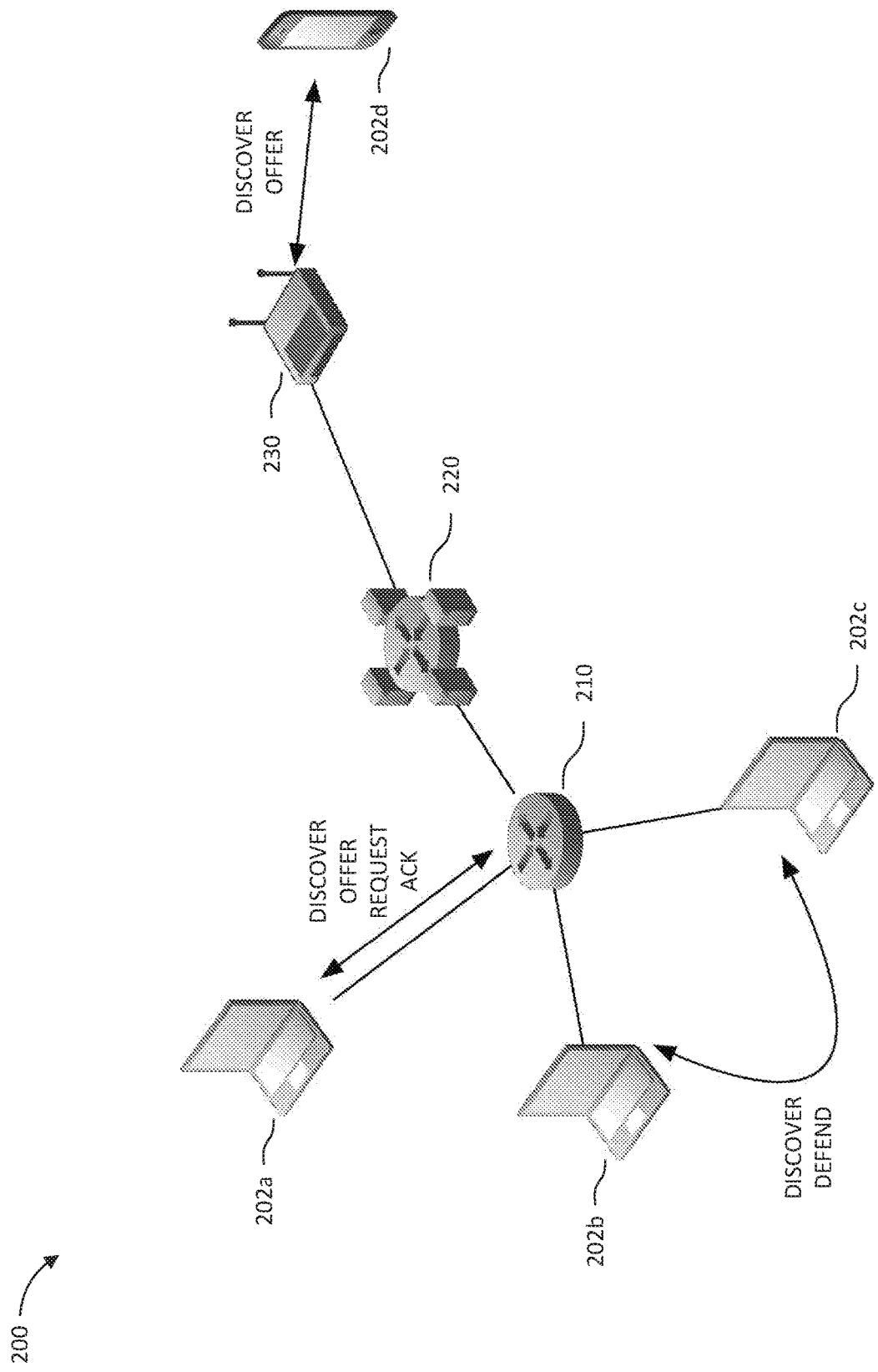
FIG. 2 is a system diagram illustrating an example communications system in which multicast and unicast MAC address assignment protocol (MUMAAP) is implemented.

FIG. 2 is a system diagram illustrating an example communications system 200 in which multicast and unicast MAC address assignment protocol (MUMAAP) is implemented. As illustrated in FIG. 2, the communications system 200 for MUMAAP may comprise nodes 202a, 202b, 202c, 202d, proxies (or servers) 210, 230, and a network device connecting proxies (or servers) 220. The nodes 202a, 202b, 202c, 202d may be referred to as a client that is configured to transmit and/or receive wired or wireless signals. Examples of the nodes 202a, 202b, 202c, 202d may include, but are not limited to, a station (STA), WTRU, a user equipment (UE), a mobile station, a smartphone, a laptop, a netbook, a personal computer, a wireless sensor, an Internet of Things (Iot) device, and a wearable devices. The proxies 210, 230 may be referred to as a server that is configured to transmit and/or receive wired or wireless signals. Examples of the proxies 210, 230 may include, but are not limited to, a server, a base station, a switch, a site controller, an access point (AP), a hypervisor, and a router. The network device 220 may be any type of device that can connect the proxies 210, 230.

In one embodiment that implements MUMAAP, the node 202a may transmit a DISCOVER message to the proxy 210 based on a unicast media access control (MAC) address of the proxy 210 or a multicast MAC address associated with the proxy 210 or to which the proxy 210 is going to listen. The DISCOVER message may or may not include a MAC address or a range of MAC addresses (i.e. first MAC address or first range of MAC addresses). If the MAC address or the range of MAC addresses is included in the DISCOVER message, the MAC address or the range of MAC addresses may be determined based on prior MAC address allocation information. The prior MAC address allocation information may include a prior MAC address or a range of addresses that was allocated to the node 202a using MUMAAP. Alternatively or additionally, the MAC address or the range of MAC addresses included in the DISCOVER message may be determined randomly. It is noted that the node 202a may or may not be preconfigured with an initial MAC address. For example, the network card of the node 202a was manufactured without a MAC address on its hardware.

After transmitting the DISCOVER message to the proxy 210, the node 202a may initiate a timer associated with the OFFER message that is expected to receive and increase a counter value, for example, by one (1). The counter value may indicate a number of transmission for DISCOVER messages. If an OFFER message is received from the proxy 210, the timer may be reset or initialized. If the OFFER message is not received, the timer is not expired, and the counter value is less than a predetermined number, the node 202a may retransmit the DISCOVER message to the proxy 210 using the unicast MAC address of the proxy 210 or the multicast MAC address associated with the proxy 210 or to which the proxy 210 is listening.

After transmitting the DISCOVER message to the proxy 210, the node 202a may receive an OFFER message from the proxy 210. The OFFER message may include a range of MAC addresses (i.e. second range of MAC addresses) that can be allocated to the node 202a. This range of MAC addresses may be determined by the proxy 210 based on the available MAC address pool in the proxy 210. In determining the range of MAC addresses, the proxy 210 may also consider the MAC address or the range of MAC addresses (in the DISCOVER message) received from the node 202a. The range of MAC addresses determined by the proxy 210 may be a range of unicast MAC addresses or a range of multicast MAC addresses.

Upon receiving the OFFER message, the node 202a may select a MAC address (i.e. second MAC address) from the range of MAC addresses in the OFFER message. The selected MAC address may be a unicast MAC address or a multicast MAC address that is to be allocated to the node 202a. The node 202a may select the (second) MAC address based on the (first) MAC address or the (first) range of MAC addresses transmitted in the DISCOVER message. For example, the selected (second) MAC address may be the same as the transmitted (first) MAC address or within the transmitted (first) range of MAC addresses.

Upon selecting the (second) MAC address, the node 202a may transmit, to the proxy 210, a REQUEST message including the (second) MAC address or the (second) range of MAC addresses to indicate that the (second) MAC address or the (second) range of MAC addresses has been allocated to the node 202a. The node 202a may then receive, from the proxy 210, an ACK message indicating that the second MAC address or the second range of MAC addresses is allocated to the first node.

In another embodiment that implements MUMAAP, the node 202b may transmit a DISCOVER message to the node 202c based on a unicast media access control (MAC) address of the node 202c or a multicast MAC address associated with the node 202c (e.g., to which the node 202c is going to listen). The node 202b may also initiate a counter and a timer. The DISCOVER message may include a MAC address or a range of MAC addresses and may be transmitted to other nodes 202a, 202c, 202d or proxies 210, 230 to verify whether the MAC address or the range of MAC addresses is available (i.e. can be allocated to the node 202b). The MAC address or the range of MAC addresses may be determined based on previously allocated MAC address or range of MAC addresses to the node 202b. Alternatively or additionally, the MAC address or the range of MAC addresses included in the DISCOVER message may be determined randomly. It is noted that the node 202b may or may not be preconfigured with an initial MAC address. For example, the network card of the node 202b was manufactured without a MAC address on its hardware.

If a DEFEND message is received form the node 202c while the timer is running, the node 202b may stop the timer and generate a DISCOVER message with a new MAC address or new range of MAC addresses. The DEFEND message may indicate that the transmitted MAC address or range of MAC addresses is not available for the allocation to the node 202b (i.e. used by the node 202c). Once the new MAC address or new range of MAC addresses is generated, the node 202b may transmit the DISCOVER message to the node 202c based on a unicast MAC address of the node 202c or a multicast MAC address associated with the node 202c (or to which the node 202c is listening). If the DEFEND message is not receive but the timer is expired, the node 202b may reset the timer and decrease the counter. Once the counter goes below zero, the node 202b may transmit an ANNOUNCE message to other nodes 202a, 202c, 202d indicating that a MAC address or a range of MAC addresses has been allocated to the node 202b.

In another embodiment, the node 202d (e.g., station) may transmit a DISCOVER message to the proxy 230 (e.g., AP) based on a unicast media access control (MAC) address of the proxy 230 or a multicast MAC address associated with the proxy 230 (or to which the proxy 230 is going to listen). The DISCOVER message may include a MAC address or a range of MAC addresses to verify whether the MAC address or the range of MAC addresses is available for the allocation to the node 202d. The MAC address or the range of MAC addresses may be determined based on previously allocated MAC address or range of MAC addresses to the node 202d. Alternatively or additionally, the MAC address or the range of MAC addresses included in the DISCOVER message may be determined randomly. It is noted that the node 202d may or may not be preconfigured with an initial MAC address. In response to the DISCOVER message, the node 202d may receive an OFFER message with various status indication from the proxy 230. With status indication equal to one (1), the node 202d may understand that the MAC address or the range of MAC addresses transmitted in the DISCOVER message is free to allocate. With status indication equal to two (2) or three (3), the node 202d may understand that the MAC address or the range of MAC addresses transmitted in the DISCOVER message is not free to allocate or that an error has been occurred between the proxy 230 and the node 202d.

Figure 3:
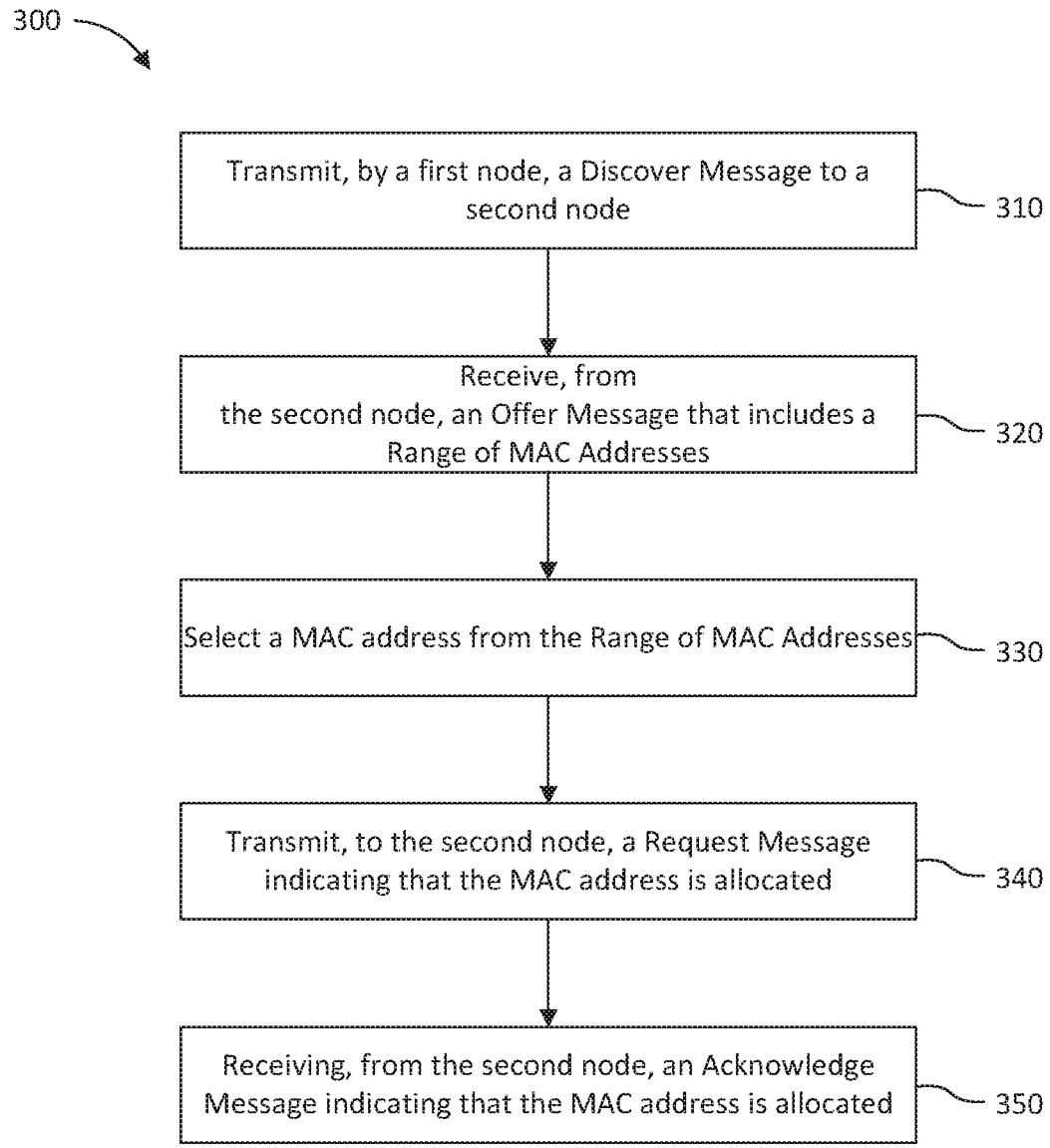
FIG. 3 is a diagram illustrating an example MUMAAP procedure.

FIG. 3 is a diagram illustrating an example MUMAAP procedure 300, which may be used in combination with any of other embodiments described herein. At step 310, a first node in a wired or wireless network may transmit, to a second node, a DISCOVER message using a unicast MAC address of the second node or a multicast MAC address associated with the second node or to which the second node is going to listen. The discover message may or may not include a first MAC address or a first range of MAC addresses. If the DISCOVER message includes the first MAC address or the first range of MAC addresses, the first MAC address or the first range of MAC addresses may be determined based on a prior MAC address allocation information. For example, the prior MAC address allocation information may be a MAC address or a range of MAC addresses that was allocated to the first node before the first node is turned on.

At step 320, the first node may receive, from the second node, an OFFER message with a second range of MAC addresses. The second range of MAC addresses may be determined by the second node based on the MAC address pool available to the second node. A MAC address or a range of MAC addresses may be allocated to the first node based on the second range of MAC addresses. The second range of MAC addresses may include a range of unicast MAC addresses or a range of multicast addresses.

At step 330, the first node may select a second MAC address from the second range of MAC addresses. The selected second MAC address may be the same as the first MAC address or within the first range of MAC addresses. The second MAC address may be a unicast MAC address or a multicast MAC address that is to be allocated to the first node.

At step 340, the first node may transmit, to the second node, a REQUEST message indicating that the second MAC address or the second range of MAC addresses is allocated to the first node. In response to the REQUEST message, at step 350, the first node may receive, from the second node, an ACKNOWLEDGE message indicating that the second MAC address or the second range of MAC addresses is allocated to the first node in the network. The first node may be a client with or without a preconfigured initial MAC address and the second node may be a proxy or a sever. Each of the DISCOVER, OFFER, REQUEST, and ACKNOWLEDGEMENT messages may be encapsulated in a frame with a protocol type indicating Audio/Video Transport Protocol (AVTP) with a subtype indicating IEEE 802.1CQ.

Embodiments for example message formats are described herein. The EtherType of all MUMAAP frames may be the EtherType given in Table 5.

TABLE 5

| MUMAAP EtherType |
|---|
| MUMAAP EtherType |
| $FD_{16}$ (as an example) |

The message format of the protocol(s) discussed herein may use a common control header, which may be included on all messages of the protocol. An example of the control header is in Table 6.

The different fields of the control header may be as follows: Subtype (8 bits), where the 1-octet subtype field is used to identify the format being carried by MUMAAP and distinguish between the MASAP and the MASBAP protocols, as defined in Table 7; Version (3 bits), where there may be three bits indicating the version of the protocol (as disclosed herein, all bits set to 0 may denote the first version of the protocol); message_type (5 bits), which is a field that contains one of the defined MUMAAP message types as defined in Table 8, and if a MUMAAP message is received with a reserved message_type, the MUMAAP frame may be ignored; control_word (16 bits), which may include the flags as shown in Table 9; cookie (16 bits), which is a field that must be incremented from a local counter, for every new transaction in MUMAAP variants, where frames that are originated as a consequence of receiving another frame may copy the cookie of the originating frame since they belong to the same dialog; status (4 bits), where a status code may indicate the result of an action, which may be chosen from Table 10; and/or, length (12 bits), which is the length of the message in octets.

TABLE 7

| MUMAAP Subtype | |
|---|---|
| MUMAAP Subtype | |
| MUMAAP | 01 |

TABLE 8

| Message Type | | |
|---|---|---|
| Value | Function | Description |
| 0 | — | Reserved |
| 1 | DISCOVER | Probe MAC address(es) |
| 2 | DEFEND | Defend MAC address(es) |
| 3 | ANNOUNCE | Announce MAC address(es) |
| 4 | OFFER | Answer from proxy regarding Probe messages |
| 5 | OFFER | MAC allocation offer from the server |
| 6 | REQUEST | Confirmation of the addresses to be allocated |
| 7 | ACK | Confirmation of allocation from server to station or error reporting |
| 8-1024 | — | Reserved |

TABLE 9

| Control Word Behavior | | |
|---|---|---|
| Bit | Name | Description |
| 0 | AAI | Bit set to 1: Address in the AAI space requested/provided |
| 1 | ELI | Bit set to 1: Address in the ELI space requested/provided |

TABLE 6

| MUMAAP Base Header | | | | | | |
|---|---|---|---|---|---|---|
| 0 | 7 | 8 | 10 11 | 15 16 | | 31 |
| subtype | | ver | message_type | control_word | | |
| Cookie | | | | Status | length | |

TABLE 9-continued

Control Word Behavior

| Bit | Name | Description |
|---|---|---|
| 2 | SAI | Bit set to 1: Address in the SAI space requested/provided |
| 3 | Reserved | Reserved for future use |
| 4 | 64/48 bits | Bit set to 1: 64 bits address requested/provided |
|   |   | Bit set to 0: 48 bits address requested/provided |
| 5 | Multicast/Unicast | Bit set to 1: Multicast address requested/provided |
|   |   | Bit set to 0: Unicast address requested/provided |
| 6 | Infrastructure/Station | Bit set to 1: Message source is Server/Proxy |
|   |   | Bit set to 0: Message source is an end-node |
| 7 | MAC Provided | Bit set to 1: MAC address is provided |
|   |   | Bit set to 0: MAC address is not provided |
|   |   | This bit is used by a station providing an already used MAC address as hint to a Server. |
| 8 | Station ID provided | Bit set to 1: Station ID is provided |
|   |   | Bit set to 0: Station ID is not provided |
| 9 | Network ID provided | Bit set to 1: Network ID is provided |
|   |   | Bit set to 0: Network ID is not provided |
| 10 | Code field provided | Bit set to 1: The message contains a code field |
|   |   | Bit set to 0: The message does not contain a code field |
| 11 | Specific address type | Bit set to 1: Specific address type information is provided |
|   |   | Bit set to 0: Specific address type information is not provided |
| 12 | Source MAC address provided | Bit set to 1: Specific address to be used as source of REQUEST is provided |
|   |   | Bit set to 0: Specific address to be used as source of REQUEST is not provided |
| 13-15 | Reserved | Reserved for future use |

TABLE 10

Status Values

| Value | Description |
|---|---|
| 0 | Field not used |
| 1 | MAC Range not in use |
| 2 | MAC Range in use |
| 3 | Re-generate addresses in the given prefix and use MASAP |
| 4 | ACK - Assignment accepted |
| 5 | Failure - Assignment cannot be completed |
| 6 | Failure - Requested quadrant not available |
| 7 | Failure - Requested range not available |
| 8 | Offer provided |
| 9 | Mandatory use of MASAP |
| 10 | Mandatory use of MASBAP |
| 11 | Parameter problem |
| 12 | Offer Provided - Partial fulfillment |
| 13-15 | Reserved |

MASAP messages may comprise different options that can be transported by the protocol depending on the actual message being carried. Initially, the options that can be transported may be defined, and later which options can be added to the message may be indicated for each message and the values that they need to carry. For all options, a type field is shown in Table 11. Length expresses the length of the option in Octets.

TABLE 11

Options code values

| Type ID | Description |
|---|---|
| 0 | Station ID |
| 1 | 48 bits MAC Address (Range) |
| 2 | 64 bits MAC Address (Range) |
| 3 | Network ID |

TABLE 11-continued

Options code values

| Type ID | Description |
|---|---|
| 4 | Specific MAC Range |
| 5 | 48 bits MAC Range in Conflict |
| 6 | 64 bits MAC Range in Conflict |
| 7 | MAC Address Count |
| 8 | Lifetime |

The station ID option may provide up to 255 bytes to include the identifier of the station as shown in Table 12.

TABLE 12

Station ID

| Type | Length | Station Identifier |
|---|---|---|
| 1 Octet | 1 Octet | Up to 255 Octets |

In all cases of a station receiving a message, different from DISCOVER, ANNOUNCE or DEFEND, with a Station ID that does not correspond to itself, the packet must be dropped and the processing stopped.

For 48 bits MAC address (Range), this option may provide the mechanism to transport a MAC address of 48 bits plus a 16 bit number indicating the amount of addresses requested. If a single address, not a range, wants to be specified, the Count must be set to 1. When the Count is higher than one, then the count may indicate that multiple MAC addresses are assigned or requested, starting with the MAC Address and including the next sequential addresses up to the count. For example, see Table 13.

TABLE 13

48 bit MAC Address

| Type | Length | MAC Address | Count |
|---|---|---|---|
| 1 Octet | 1 Octet | 48 bits | 16 bits |

For 64 bits MAC Address (Range), this option may provide a mechanism to transport a MAC address of 64 bits plus a 16 bit number indicating the amount of addresses requested. If a single address, not a range, wants to be specified, the Count may need to be set to 1. For example, see Table 14.

TABLE 14

64 bit MAC Address

| Type | Length | MAC Address | Count |
|---|---|---|---|
| 1 Octet | 1 Octet | 64 bits | 16 bits |

For Network ID, this option may provide up to 255 bytes to include the identifier of the network. See for example Table 15.

TABLE 15

Network ID

| Type | Length | Network Identifier |
|---|---|---|
| 1 Octet | 1 Octet | Up to 255 Octets |

For specific MAC range, this option may be included in order for the Server to request the station to perform self-claiming in a specific address space. See for example Table 16.

TABLE 16

Specific MAC Range

| Type | Length | Length of MAC Address Prefix Subfield (bytes) | Prefix Trim subfield (bits) | Reserved | MAC Address Prefix (Bytes) |
|---|---|---|---|---|---|
| 1 Octet | 1 Octet | 3 bits | 3 bits | 2 bits | 0-8 Octets |

The Length of MAC Address Prefix Bytes subfield may be a subfield of 3 bits. When the Length of MAC Address Prefix subfield is set to one of the values of 1-6, that value may indicate the length (e.g., in octets) of the MAC Address Prefix Bytes field. In some cases, the Length of MAC Address Prefix Bytes subfield is not set to 0 or 7 because those values may be reserved.

The Prefix Trim subfield may be a subfield of 3 bits and takes one of the values of 0-7, where that value indicates a number of bits to be truncated from the end of the MAC Address Prefix subfield in order to obtain the MAC Address Prefix. In other words, the MAC Address Prefix may be represented as the value of the MAC Address Prefix Bytes field after truncation of some of the most significant bits of the last octet, with the number of truncated bits equal to the value of the Prefix Trim subfield.

The MAC Address Prefix Bytes field may be a field of 1 to 8 octets, with the length signaled in the Length of MAC Address Prefix subfield of the Policy Flags field, which may contain the full bytes, prior to truncation per the Prefix Trim subfield, of the MAC Address Prefix relevant to address self-assignment.

For 48 bits MAC range in conflict, this option may provide the mechanism to transport a MAC address of 48 bits in conflict plus a 16 bit number indicating the amount of addresses that are in conflict. If a single address, not a range, wants to be specified, the Count may need to be set to 1. See for example Table 17.

TABLE 17

48 bit MAC Range

| Type | Length | MAC Address | Count |
|---|---|---|---|
| 1 Octet | 1 Octet | 48 bits | 16 bits |

For 64 bits MAC range in conflict, this option may provide the mechanism to transport a MAC address of 64 bits in conflict plus a 16 bit number indicating the amount of addresses that are in conflict. If a single address, not a range, wants to be specified, Count may need to be set to 1. See for example Table 18.

TABLE 18

64 bit MAC Range

| Type | Length | MAC Address | Count |
|---|---|---|---|
| 1 Octet | 1 Octet | 64 bits | 16 bits |

For MAC address count, this option may provide a mechanism for the station to request a number of address without providing a MAC address range. For example see Table 19.

TABLE 19

MAC Address Count

| Type | Length | MAC Address Count |
|---|---|---|
| 1 Octet | 1 Octet | 1-2 Octets |

In case the MAC address count option is not present in a REQUEST, it may be assumed that the request is for a single MAC address.

For Lifetime, this option may enable the server to set a lifetime for the specific MAC address leasing. See for example Table 20.

TABLE 20

Lifetime

| Type | Length | Lifetime |
|---|---|---|
| 1 Octet | 1 Octet | 2 Octets |

Concerning MASAP protocol messages, the self-claiming the protocol may use the following definition of messages. For DISCOVER, this message may be used to prove for a free MAC address range. The DISCOVER message may include the following options in Table 21.

TABLE 21

DISCOVER

| 0 | 7 | 8 | 10 | 11 | 15 | 16 | 31 |
|---|---|---|---|---|---|---|---|
| subtype | | ver | message_type | | control_word | | |
| Cookie | | | | | Status | length | |
| (Optional) Station ID | | | | | | | |
| 48 bits MAC Address (Range) OR 64 bits MAC Address (Range) | | | | | | | |

For control_word, bits may need turn 1 or 0 according to the following list: Bits 0 to 2 may need to be turned to 1 depending on the quadrant the address being self-claimed belongs to; Bit 4 may indicate if the address being self-claimed is 64 or 48 bits; Bit 5 may indicate if the address is unicast or multicast; Bit 6 may be set to 0, indicating this message is originated at a station; and/or Bit 7 may need to be set to 1, indicating the message carries MAC addresses.

For status, this field may need to be set to 0 in this message.

For station ID, this optionally may include the ID of the station sending this message.

For the 48 bits MAC Address (Range) or 64 bits MAC Address (Range), these may be the first address of a consecutive range of addresses being requested. The count field may be the number of addresses being requested. If only a single address is being requested, this field may be set to one (1).

Concerning DEFEND, this message may be used to defend an already acquired MAC address range. See for example Table 22.

TABLE 22

| DEFEND | | | |
|---|---|---|---|
| 0        7   8    10  11    15  16                                              31 | | | |
| subtype | ver | message_type | control_word |
| Cookie | | Status | length |
| (Optional) Station ID | | | |
| 48 bits MAC Address (Range) OR 64 bits MAC Address (Range) | | | |
| 48 bits MAC Range in Conflict OR 64 bits MAC Range in Conflict | | | |

For control_word, the bits may need to be turned to 1 or 0 copying the values from the DISCOVER message that triggered this message, where: Bits 0 to 2 may need to be turned to 1 depending on the quadrant the address being self-claimed belongs to; Bit 4 may indicate if the address being self-claimed is 64 or 48 bits; Bit 5 may indicate if the address is unicast or multicast; Bit 6 may be set to 0, indicating this message is originated at a station; and/or, Bit 7 may need to be set to 1, indicating the message carries MAC addresses.

For status, the field may need to be set to 0 in this message.

For Station ID, this may be copied from the originating DISCOVER message. If the DISCOVER message originating this message contains a Station ID, this option may need to be copied from the one in the DISCOVER message.

For the 48 bits MAC Address (Range) or 64 bits MAC Address (Range), these may be copied from the originating DISCOVER message.

For the 48 bit MAC Range in Conflict or 64 bits MAC Range in Conflict, these may be set to the first address that conflicts with a requested address range from a DISCOVER. Count in this case may be set to the number of addresses in conflict from the range.

Concerning ANNOUNCE, this message may be used to announce an already allocated MAC address range. See for example Table 23.

TABLE 23

| ANNOUNCE | | | |
|---|---|---|---|
| 0        7   8    10  11    15  16                                              31 | | | |
| subtype | ver | message_type | control_word |
| Cookie | | Status | length |
| (Optional) Station ID | | | |
| 48 bits MAC Address (Range) OR 64 bits MAC Address (Range) | | | |

For control_word, the bits may need to be turned to 1 or 0 according to the following list: Bits 0 to 2 may need to be turned to 1 depending on the quadrant the address being self-claimed belongs to; Bit 4 may indicate if the address being self-claimed is 64 or 48 bits; Bit 5 may indicate if the address is unicast or multicast; Bit 6 may be set to 0, indicating this message is originated at a station; and/or, Bit 7 may need to be set to 1, indicating the message carries MAC addresses.

For status, this field may need to be set to 0 in this message.

For Station ID, this optionally may include the ID of the station sending this message.

For 48 bits MAC Address (Range) or 64 bits MAC Address (Range), these may be the first address of a consecutive range of addresses being allocated to the station. The count field may be the number of addresses that have been allocated, starting with the one provided in the MAC Address field. If only a single address is being requested, this field may be set to one (1).

Concerning OFFER, this message may be used by a Server/Proxy to shorten the time required to Probe a MAC Address Range. The idea behind this message is that in the case of a Proxy book-keeping the addresses used in the network, it may quickly state the status of the addresses being probed. This message may also be used to request the station to repeat the probe in a different MAC address range. See for example Table 24.

TABLE 24

| OFFER | | | | | |
|---|---|---|---|---|---|
| 0 | 7  8 | 10  11 | 15  16 | | 31 |
| subtype | ver | message_type | control_word | | |
| Cookie | | | Status | length | |
| (Optional) Network ID | | | | | |
| (Optional) Specific MAC Range | | | | | |
| (Optional) 48 bits MAC Address (Range) OR 64 bits MAC Address (Range) | | | | | |
| (Optional) 48 bits MAC Range in Conflict OR 64 bits MAC Range in Conflict | | | | | |

For control_word, the bits may need to be turned to 1 or 0 according to the following list: Bits 0 to 2 may need to be turned to 1 depending on the quadrant the address being self-claimed belongs to; Bit 4 may indicate if the address being self-claimed is 64 or 48 bits; Bit 5 may indicate if the address is unicast or multicast; Bit 6 may be set to 1, indicating this message is originated at a server; and/or, Bit 7 may need to be set to 1 in case that the Specific MAC Range is provided, indicating the message carries MAC addresses range.

For the status, this field may need to be set to either 1, 2, 3 or 12 in this message. The meaning of each code may be as follows: 1, which indicates the MAC Range is not in use and the address can be directly allocated to the station; 2, which indicates the MAC Range is in use and the station must choose a different range immediately; 3, which indicates the station may generate a new address or range of addresses in the range provided in the Specific MAC Range option and try self-claiming again. In case that status takes the value 3, then the option Specific MAC Range may be provided; and/or, 10, where MASAP is not supported in the network and MASBAP need to be used.

In case that the status takes the value 2, the 48 bits MAC Address (Range) or 64 bits MAC Address (Range) and the 48 bits MAC Range in Conflict or 64 bits MAC Range in Conflict may need to be present in the message, with the same meaning as in the DEFEND message.

For Network ID, this optionally may provide an indication of the network that this server is serving.

There may be one or more MASBAP protocol messages, where the server based protocol defines the following messages.

DISCOVER is a message that may be used to start the dialog with any Proxy/Server in the network. See for example Table 25.

TABLE 25

| DISCOVER | | | |
|---|---|---|---|
| 0          7   8        10  11        15  16                                           31 | | | |
| subtype | ver | message_type | control_word |
| Cookie | | Status | length |
| (Optional) Station ID | | | |
| (Optional) Specific MAC Range | | | |
| (Optional) 48 bits MAC Address (Range) OR 64 bits MAC Address (Range) | | | |
| (Optional) MAC Address Count | | | |

For control_word, the bits may need to be turned to 1 or 0 according to the following list: Bits 0 to 2 may need to be turned to 1 depending on the quadrant the address being requested; Bit 4 may indicate if the address requested is 64 or 48 bits; Bit 5 may indicate if the address requested is unicast or multicast; Bit 6 may be set to 0, indicating this message is originated at a station; and/or, Bit 7 may need to be set to 1 or 0, depending if the message carries the Specific MAC Range or 48/64 MAC Address (Ranges).

For status, this field may need to be set to 0 in this message.

For Station ID, this may optionally contain the ID of the station sending this message. Station ID may be mandatory in case the message contains a 48 bits MAC Address (Range) or 64 bits MAC Address (Range).

A specific MAC Range may be used to provide to the server a range for the MAC address being requested. The server may try to assign a MAC address belonging to the range provided in this option.

For 48 bits MAC Address (Range) or 64 bits MAC Address (Range), this may be used to provide a MAC Address or a range of MAC addresses that have been previously assigned to the station. The server may try to assign the same MAC Address or range to the station. If only a single address is being requested, this field may be set to one (1).

A MAC Address Count may be used to request for a range of addresses without defining the range where the MAC Addresses belong to. This option may not be added if a 48 bits MAC Address (Range) or 64 bits MAC Address (Range) is provided. In case that neither of the two options are provided, the server may assume a single MAC address is requested.

Concerning OFFER, upon reception of a DISCOVER message, the server may send an offer for possible MAC address allocation to the client. It is noted that this allocation may consider the different hints provided by the station. See for example Table 26.

TABLE 26

| OFFER | | | |
|---|---|---|---|
| 0          7   8        10  11        15  16                                           31 | | | |
| subtype | ver | message_type | control_word |
| Cookie | | Status | length |
| (Optional) Network ID | | | |
| (Optional) Station ID | | | |
| Lifetime | | | |
| 48 bits MAC Address (Range) OR 64 bits MAC Address (Range) | | | |

For control_word, these bits may need to be turned 1 or 0 according to the following list: Bits 0 to 2 may need to be turned to 1 depending on the quadrant the address being allocated. Bit 4 may indicate if the address allocated is 64 or 48 bits; Bit 5 may indicate if the address allocated is unicast or multicast; Bit 6 may be set to 1, indicating this message is originated at a server; and/or, Bit 7 may need to be set to 1 indicating the message carries a 48/64 MAC Address (Ranges).

The status field may need to be set to 8 indicating an ongoing process or to 12 indicating a partial fulfillment of the constraints sent in the DISCOVER.

A Network ID may optionally contain the ID of the network the proxy sending this message belongs to.

A Station ID may optionally copy the Station ID from the DISCOVER message.

A Lifetime may indicate the lifetime of the leasing. A Lifetime option may need to be provided.

For 48 bits MAC Address (Range) or 64 bits MAC Address (Range), these may be used to provide a MAC Address or a range of MAC addresses to the station. This option may need to be provided in this message.

Concerning the REQUEST message, upon receiving an OFFER message, the station may confirm that allocation of the address(es) to the server through this message. The server may not consider the addresses allocated before this message is received. See for example Table 27.

TABLE 27

REQUEST

| 0 | 7 | 8 | 10 | 11 | 15 | 16 | 31 |
|---|---|---|---|---|---|---|---|
| subtype | | ver | | message_type | | control_word | |
| Cookie | | | | | Status | length | |
| (Optional) Network ID | | | | | | | |
| (Optional) Station ID | | | | | | | |
| Lifetime | | | | | | | |
| 48 bits MAC Address (Range) OR 64 bits MAC Address (Range) | | | | | | | |

For control_word, these bits may need to be turned 1 or 0 according to the following list: Bits 0 to 2 may need to be turned to 1 depending on the quadrant the address being allocated; Bit 4 may indicate if the address allocated is 64 or 48 bits; Bit 5 may indicate if the address allocated is unicast or multicast; Bit 6 may be set to 0, indicating this message is originated at a station; and/or, Bit 7 may need to be set to 1 indicating the message carries a 48/64 MAC Address (Ranges).

A status field may need to be set to 0.

A Network ID may optionally copy the Network ID in the OFFER message.

A Station ID may optionally include the Station ID.

A Lifetime may indicate the lifetime of the leasing copied from the OFFER message.

For 48 bits MAC Address (Range) or 64 bits MAC Address (Range), these may be copied from the OFFER message.

Concerning the ACK message, this message may be used for the station to acknowledge the assignment of the address. In some cases, this may be sent as an answer to a REQUEST to close the assignment process, although it may also be used by the server to notify the station of any error, answer with it to a DISCOVER message. See example Table 28.

1, indicating the message carries a 48/64 MAC Address (Ranges).

A status field may take multiple values, such as: 3, which may indicate MASBAP is not available, and the station should generate a MAC address or a range in the range defined in the Specific MAC Range option and use MASAP; 4, which may indicate that allocation completed successfully; 5 to 7, which may indicate failure while assigning the address considering the hints provided by the station; 9, which may indicate MASBAP is not supported, and to use MASAP; and/or, 11, where there may be a mismatch of parameters between the packets sent by the server and the ones sent by the station. Where a case status takes the value 3, then the option Specific MAC Range may need to be provided.

A Network ID may optionally include the ID of the network being serviced by the Proxy.

A Station ID may optionally include the ID of the station. In case a Station ID was provided in the REQUEST message, this option may need to be included.

A specific MAC Range may include a range to be used for MASAP. This option may need to be present in status code is 3.

ACK may be used as reply of DISCOVER and REQUEST. A station may not consider an allocation as completed until an ACK message is received.

TABLE 28

ACK

| 0 | 7 | 8 | 10 | 11 | 15 | 16 | 31 |
|---|---|---|---|---|---|---|---|
| subtype | | ver | | message_type | | control_word | |
| Cookie | | | | | Status | length | |
| (Optional) Network ID | | | | | | | |
| (Optional) Station ID | | | | | | | |
| (Optional) Specific MAC Range | | | | | | | |

The control_word bits may need to be turned 1 or 0 according to the following list: Bits 0 to 2 may need to be turned to 1 depending on the quadrant the address being allocated; Bit 4 may indicate if the address allocated is 64 or 48 bits; Bit 5 may indicate if the address allocated is unicast or multicast; Bit 6 may be set to 0, indicating this message is originated at a station; and/or, Bit 7 may need to be set to Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a first network node, the method comprising:
   transmitting, to a second network node, based on a multicast MAC address associated with the second network node, a discover message that includes at least a first MAC address or a first range of MAC addresses;
   receiving, from the second network node, an offer message with a second range of MAC addresses that can be allocated to the first network node;
   transmitting, to the second network node, a request message with a second MAC address selected from the second range of MAC addresses, wherein the request message indicates that at least the second MAC address or the second range of MAC addresses are to be allocated to the first network node; and
   receiving, from the second network node, an acknowledge message indicating that at least the second MAC address or the second range of MAC addresses are allocated to the first network node.

2. The method of claim 1, further comprising determining, based on prior MAC address allocation, the first MAC address or the first range of MAC addresses.

3. The method of claim 1, wherein the second MAC address is a unicast MAC address to be allocated to the first network node or a multicast MAC address to be allocated to the first network node.

4. The method of claim 1, wherein the second range of MAC addresses includes a range of unicast MAC addresses or a range of multicast MAC addresses.

5. The method of claim 1, wherein the discover message further includes a plurality of control_word bits, a status field, an identification of the first network node, and a MAC address count.

6. The method of claim 1, further comprising:
   upon transmitting the discover message to the second network node, initiating a timer associated with the offer message and increasing a counter indicating a number of transmitted discover messages; and
   on a condition that the timer is expired and the counter does not exceed a predetermined number of count, retransmitting the discover message to the second network node based on the multicast MAC address associated with the second network node.

7. The method of claim 1, wherein the second range of MAC addresses is determined based on at least one of a MAC address pool associated with the second network node, the first MAC address or the first range of MAC addresses.

8. The method of claim 1, wherein the offer message further includes a plurality of control_word bits, a status field, a network identification, an identification of the second network node, and a lifetime.

9. The method of claim 1, wherein the second MAC address allocated to the first network node is same as the first MAC address or the second MAC address allocated to the first network node is within the first range of MAC addresses.

10. The method of claim 1, wherein a source address of the discover message is a random MAC address or a global MAC address.

11. The method of claim 1, wherein the first network node is a client with or without a preconfigured initial MAC address and the second network node is a sever, wherein the preconfigured initial MAC address is a local address or a global address.

12. The method of claim 1, wherein each of the discover, offer, request, and acknowledgement messages is encapsulated in a frame with an indicator indicating that a protocol type is Audio/Video Transport Protocol (AVTP) with a subtype indicating IEEE 802.1CQ.

13. A first network node comprising:
   a processor;
   a receiver; and
   a transmitter,
   the processor and the transmitter configured to transmit, to a second network node, based on a multicast MAC address associated with the second network node, a discover message that includes at least a first MAC address or a first range of MAC addresses;
   the processor and the receiver configured to receive, from the second network node, an offer message with a second range of MAC addresses that can be allocated to the first network node;
   the processor and the transmitter configured to transmit, to the second network node, a request message with a second MAC address selected from the second range of MAC addresses, wherein the request message indicates that at least the second MAC address or the second range of MAC addresses are to be allocated to the first network node; and
   the processor and the receiver configured to receive, from the second network node, an acknowledge message indicating that at least the second MAC address or the second range of MAC addresses are allocated to the first network node.

14. The first network node of claim 13, wherein the processor configured to determine, based on prior MAC address allocation, the first MAC address or the first range of MAC addresses.

15. The first network node of claim 13, wherein the processor is further configured to, upon transmitting the discover message to the second network node, initiate a timer associated with the offer message and increase a counter indicating a number of transmitted discover messages, and wherein the processor and the transmitter are configured to retransmit, on a condition that the timer is expired and the counter does not exceed a predetermined number of count, the discover message to the second network node based on the multicast MAC address associated with the second network node.

16. The first network node of claim 13, wherein the second MAC address is a unicast MAC address to be allocated to the first network node or a multicast MAC address to be allocated to the first network node.

17. The first network node of claim 13, wherein the second range of MAC addresses includes a range of unicast MAC addresses or a range of multicast addresses.

18. The first network node of claim 13, wherein the second MAC address allocated to the first network node is same as the first MAC address or the second MAC address allocated to the first network node is within the first range of MAC addresses.

19. The first network node of claim 13, wherein the first network node is a client with or without a preconfigured initial MAC address and the second network node is a sever, wherein the preconfigured initial MAC address is a local address or a global address.

* * * * *